(12) United States Patent
Hung et al.

(10) Patent No.: US 11,752,371 B2
(45) Date of Patent: Sep. 12, 2023

(54) CONNECTING DEVICE OF RETAINING RING OF SAFETY BELT

(71) Applicant: YOKE INDUSTRIAL CORP., Taichung (TW)

(72) Inventors: Wei-Chieh Hung, Taichung (TW); Chia-Hsien Wang, Shengang Township (TW)

(73) Assignee: YOKE INDUSTRIAL CORP., Taichung (TW)

( * ) Notice: Subject to any disclaimer, the term of this patent is extended or adjusted under 35 U.S.C. 154(b) by 708 days.

(21) Appl. No.: 16/938,106

(22) Filed: Jul. 24, 2020

(65) Prior Publication Data
US 2021/0353982 A1  Nov. 18, 2021

(30) Foreign Application Priority Data
May 14, 2020  (TW) ................................. 109115950

(51) Int. Cl.
*A62B 35/00* (2006.01)
*F16B 21/12* (2006.01)

(52) U.S. Cl.
CPC ...... *A62B 35/0037* (2013.01); *A62B 35/0043* (2013.01); *F16B 21/12* (2013.01)

(58) Field of Classification Search
CPC .......... F16G 15/04; F16G 15/06; F16B 45/04; F16B 45/045; F16B 45/049;
(Continued)

(56) References Cited

U.S. PATENT DOCUMENTS

| 923,767 A | * | 6/1909 | Buckius | ................. F16G 15/06 411/351 |
| 3,604,227 A | * | 9/1971 | Athanason | .............. E05B 67/24 70/38 A |

(Continued)

FOREIGN PATENT DOCUMENTS

| DE | 8709817 U1 | 9/1987 |
| DE | 69735385 T2 | 10/2006 |

OTHER PUBLICATIONS

English abstract of WO9833560, corresponding to cited document DE69735385 (T2), Total of 1 page.
(Continued)

*Primary Examiner* — Daniel J Wiley
(74) *Attorney, Agent, or Firm* — Apex Juris, pllc; Hilde Coeckx (57) ABSTRACT

A connecting device of a retaining ring of a safety belt includes a main body, a bolt, and a locking member. The main body is used with the bolt to form an enclosure or not. The bolt passes through a bolt bore of the main body and has a first teeth portion and a stopper located in a first half part of the first teeth portion. The first teeth portion and the locking member are used to control the bolt to lock or to unlock. The locking member could move between a first position and a second position along an axial direction of the locking member and could rotate around a central axis of the locking member. When the bolt is at a closed position and the locking member is at the first position, a second teeth portion of the locking member is meshed with the first half part. When the bolt is at the closed position and the locking member is at the second position, the second teeth portion is meshed with the second half part.

12 Claims, 12 Drawing Sheets

(58) Field of Classification Search
CPC ............ A62B 35/0037; A62B 35/0043; A62B 35/0068; A62B 35/0075; Y10T 403/32893; Y10T 403/598; Y10T 403/599; Y10T 403/75
See application file for complete search history.

(56) References Cited

U.S. PATENT DOCUMENTS

| | | | | |
|---|---|---|---|---|
| 4,068,960 | A * | 1/1978 | Swager | F16G 15/06 403/324 |
| 7,448,823 | B2 * | 11/2008 | Silva | F16G 15/06 403/325 |
| 7,540,140 | B1 * | 6/2009 | Diaz | F16G 15/06 70/52 |
| 8,104,988 | B2 * | 1/2012 | Lunn | F16G 15/06 403/317 |
| 8,322,003 | B2 * | 12/2012 | Petzl | F16B 45/04 24/598.2 |
| 8,677,727 | B2 * | 3/2014 | Robins | F16G 15/06 403/325 |
| 8,938,864 | B2 * | 1/2015 | Casebolt | A62B 35/0037 294/82.23 |
| 9,435,484 | B1 * | 9/2016 | Yang | A62B 35/0075 |
| 9,903,440 | B2 * | 2/2018 | Ohman, III | F16G 11/00 |
| 10,143,866 | B2 * | 12/2018 | Yang | A62B 35/0025 |
| 10,895,304 | B2 * | 1/2021 | Betzler | F16G 15/06 |
| 11,524,189 | B2 * | 12/2022 | Hasse | F16B 45/045 |
| 2009/0269133 | A1 * | 10/2009 | Van Amelsfoort | E02F 3/3604 403/408.1 |
| 2013/0074469 | A1 * | 3/2013 | Robins | F16G 15/06 59/86 |
| 2017/0319880 | A1 * | 11/2017 | Yang | A62B 35/0068 |
| 2019/0069644 | A1 * | 3/2019 | Hetrich | A62B 35/0037 |
| 2021/0379426 | A1 * | 12/2021 | Hasse | A62B 35/0037 |

OTHER PUBLICATIONS

Citations of German Patent Office for DE102020122454.0, dated Feb. 10, 2021, Total of 1 page.

* cited by examiner

CONNECTING DEVICE OF RETAINING RING OF SAFETY BELT

BACKGROUND OF THE INVENTION

Technical Field

The present invention relates generally to a safety equipment, and more particularly to a connecting device of a retaining ring of a safety belt.

Description of Related Art

Based on the regulation of workplace safety, a user working at height has to be careful and to wear safety equipment, that is to connect a retaining ring of a safety belt and a support (e.g. rod of the scaffold) via a connecting device of a retaining ring of the safety belt, wherein the connecting device is connected to the support via a connecting strap. When the user falls carelessly, the connecting device prevents the safety belt worn on the user being disconnected to the support, thereby effectively avoiding the user falling from height, and personal injury could be further prevented. Thus, an accident of falling could be prevented, and the safety of the user working at height could be assured.

A conventional connecting device of a retaining ring of a safety belt includes a main body, a locking bolt, and a plurality of locking structures. The main body is used with the locking bolt which is moved between an opened position and a closed position. In the opened position, the user could insert the locking bolt through the retainer of the safety belt and fit the connecting strap of the support around the main body. In the closed position, the retaining ring of the safety belt and the connecting strap of the support are encircled in an enclosure formed by the main body and the locking bolt. The locking structures are adapted to control the connecting device of the retaining ring of the safety belt to move between the opened position and the closed position. In order to avoid the locking structures unexpectedly unlocking to cause the connecting device to move into the opened position, a plurality of locking structures is disposed to increase the difficulty of unlocking. On the other hand, the complexity of operating the connecting device is increased, leading the connecting device hard to use. Besides, the user has to use two hands to open the connecting device, so that the user does not have another free hand to work or hold the support, thereby the connecting device of the retaining ring of the safety belt still has room for improvement.

BRIEF SUMMARY OF THE INVENTION

In view of the above, the primary objective of the present invention is to provide a connecting device of a retainer of a safety belt, wherein a locking structure of the connecting device of the retainer of the safety belt is simplified.

The present invention provides a connecting device of a retaining ring of a safety belt, including a main body, a bolt, and a locking member. The main body has a body portion, a first end portion, and a second end portion, wherein the first end portion and the second end portion are respectively located at two ends of the body portion. The first end portion has a bolt bore penetrating the first end portion. The bolt has a bolt body which has a first teeth portion and a stopper, wherein the first teeth portion is formed by a plurality of teeth arranged in an axial direction of the bolt body, and the first teeth portion is divided into a first half part and a second half part by an imaginary line which is parallel to the axial direction of the bolt body. The first teeth portion has a first end and a second end, and the stopper is located at the second end of the first half part. The bolt body passes through the bolt bore. When the bolt is located at a closed position, an end of the bolt body is engaged with the second end portion, thereby forming an enclosure with the main body. The locking member having a shaft portion and a second teeth portion which is formed by a plurality of teeth arranged on at least a portion of a circumference formed around a central axis of the shaft portion. The locking member is engaged with the main body, and is rotatable along the central axis of the shaft portion, and is movable between a first position and a second position. When the bolt is located at the closed position and the locking member is located at the first position, a part of the plurality of teeth of the second teeth portion is engaged with a part of the plurality of teeth of the first half part of the first teeth portion. When a force is exerted to pull the bolt away from the closed position, the stopper abuts against at least one of the plurality of teeth of the second teeth portion, thereby the bolt is blocked by the second teeth portion. When the bolt is at the closed position and the locking member is at the second position, a part of the plurality of teeth of the second teeth portion is engaged with a part of the plurality of teeth of the second half part.

With the aforementioned design, the locking member is coupled with the usage of the bolt to simplify the operation of the connecting device. Comparing with the conventional connecting device, the operation to use the connecting device provided by the present invention has been simplified, so that the user could easily open or close the connecting device with a single hand, and another free hand could work or hold the support.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

As illustrated in FIG. 1 to FIG. 10, a connecting device 100 of a retaining ring of a safety belt of an embodiment according to the present invention includes a main body 10, a bolt 20, and a locking member 30.

Figure 1:
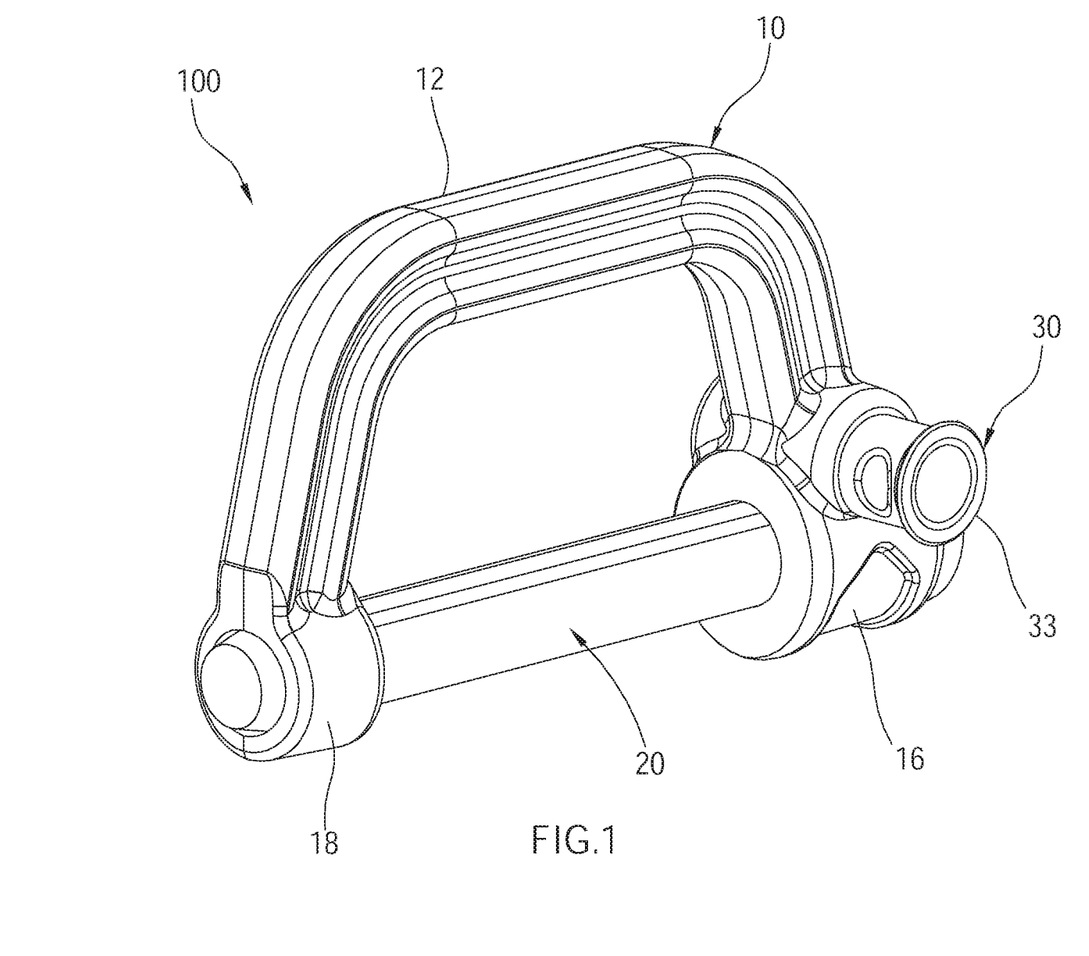
FIG. 1 is a perspective view of the connecting device of the retainer of the safety belt of an embodiment according to the present invention.
Figure 2:
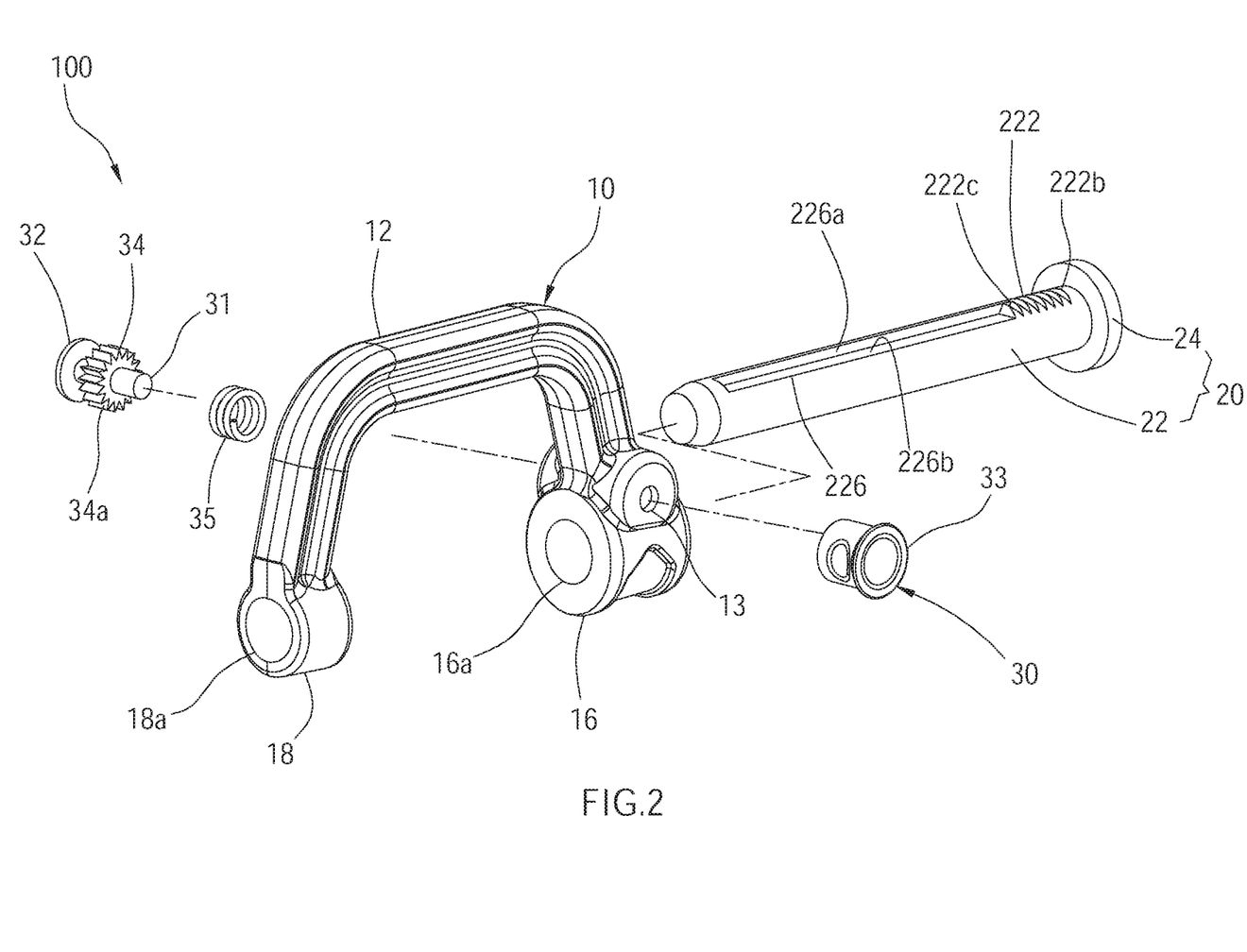
FIG. 2 is an exploded view of the connecting device of the retainer of the safety belt of the embodiment according to the present invention.
Figure 3:
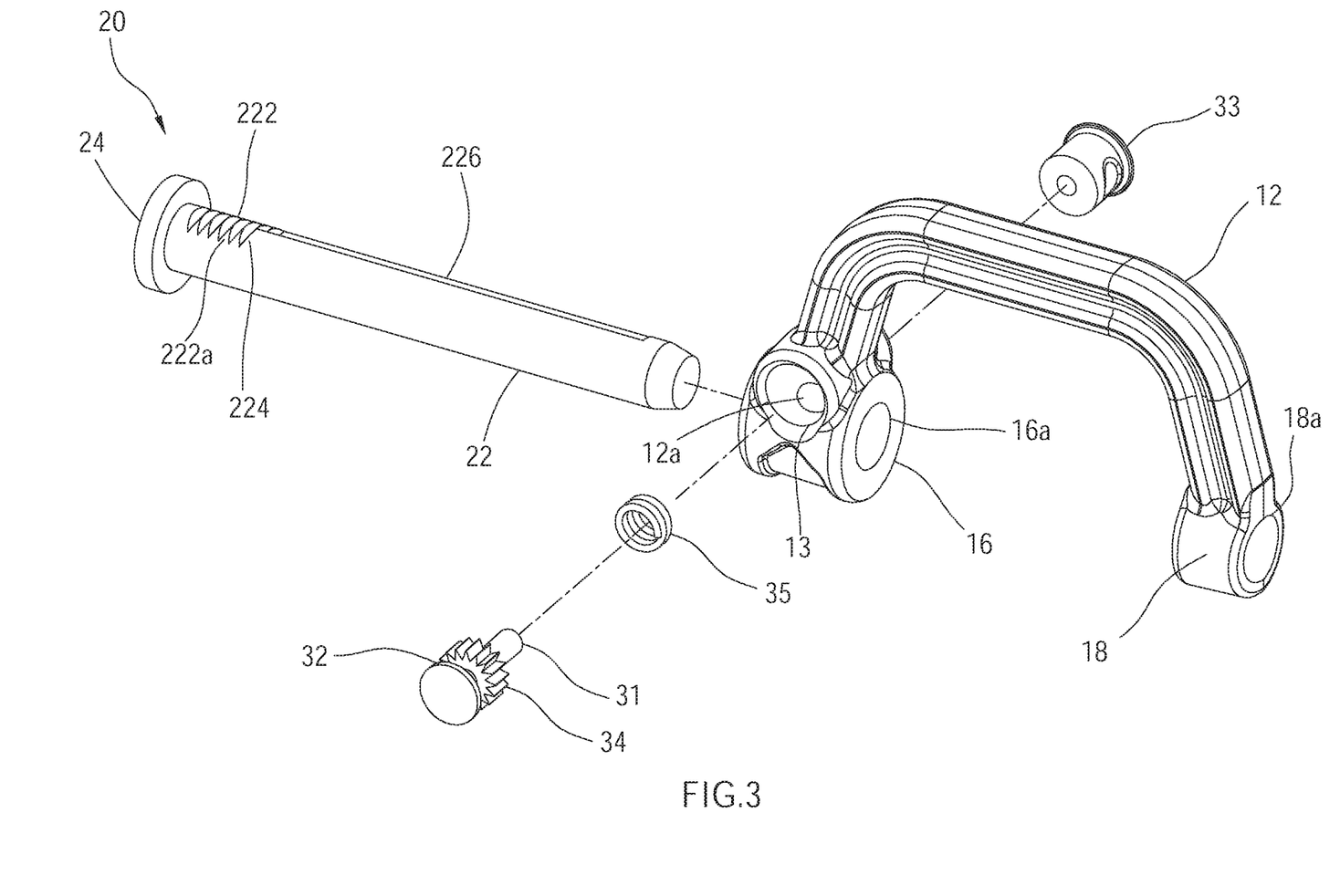
FIG. 3 is similar to FIG. 2 showing the connecting device of the retainer of the safety belt of the embodiment according to the present invention seen from another perspective.
Figure 4:
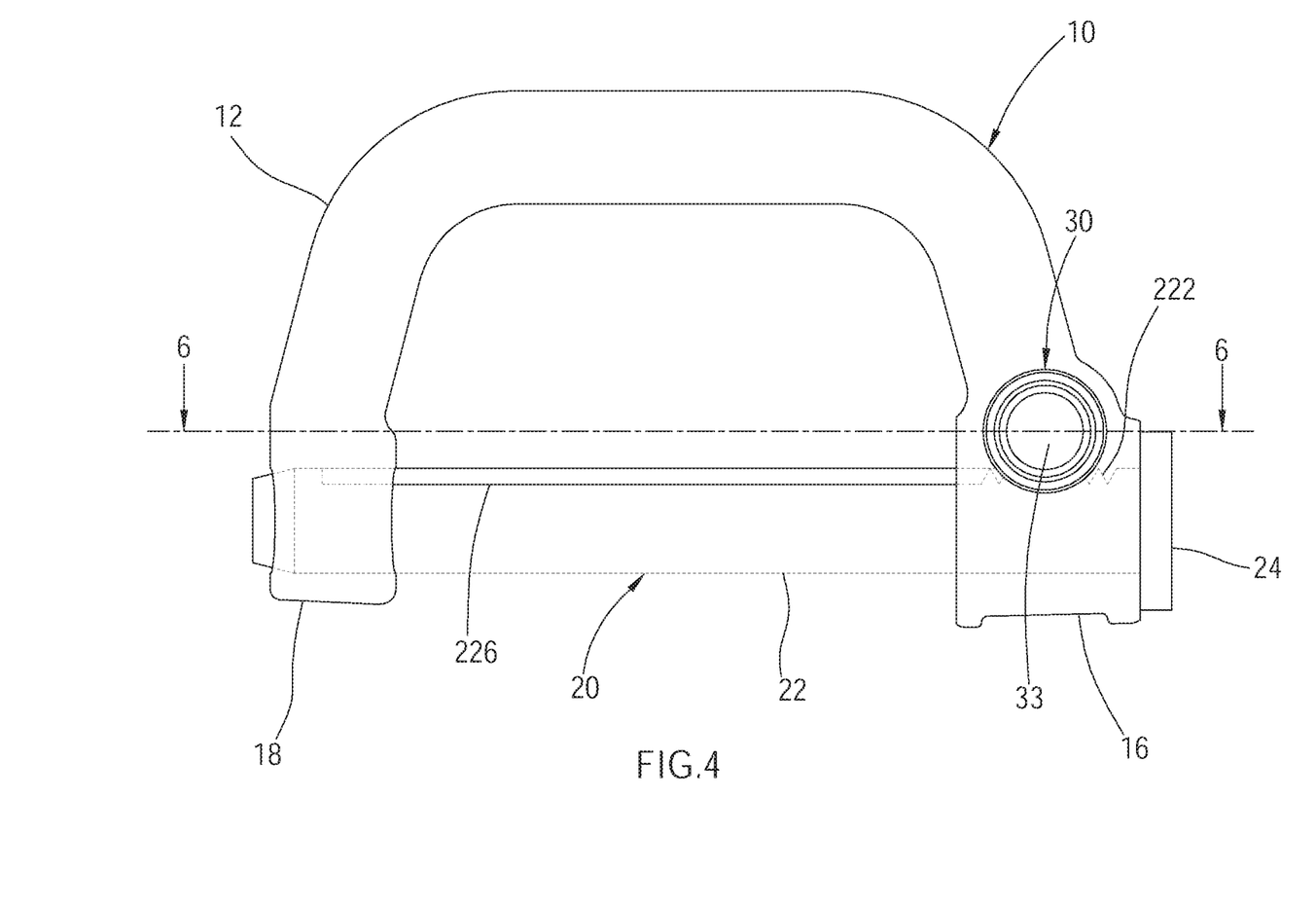
FIG. 4 is a front view of the connecting device of the embodiment according to the present invention.
Figure 6:
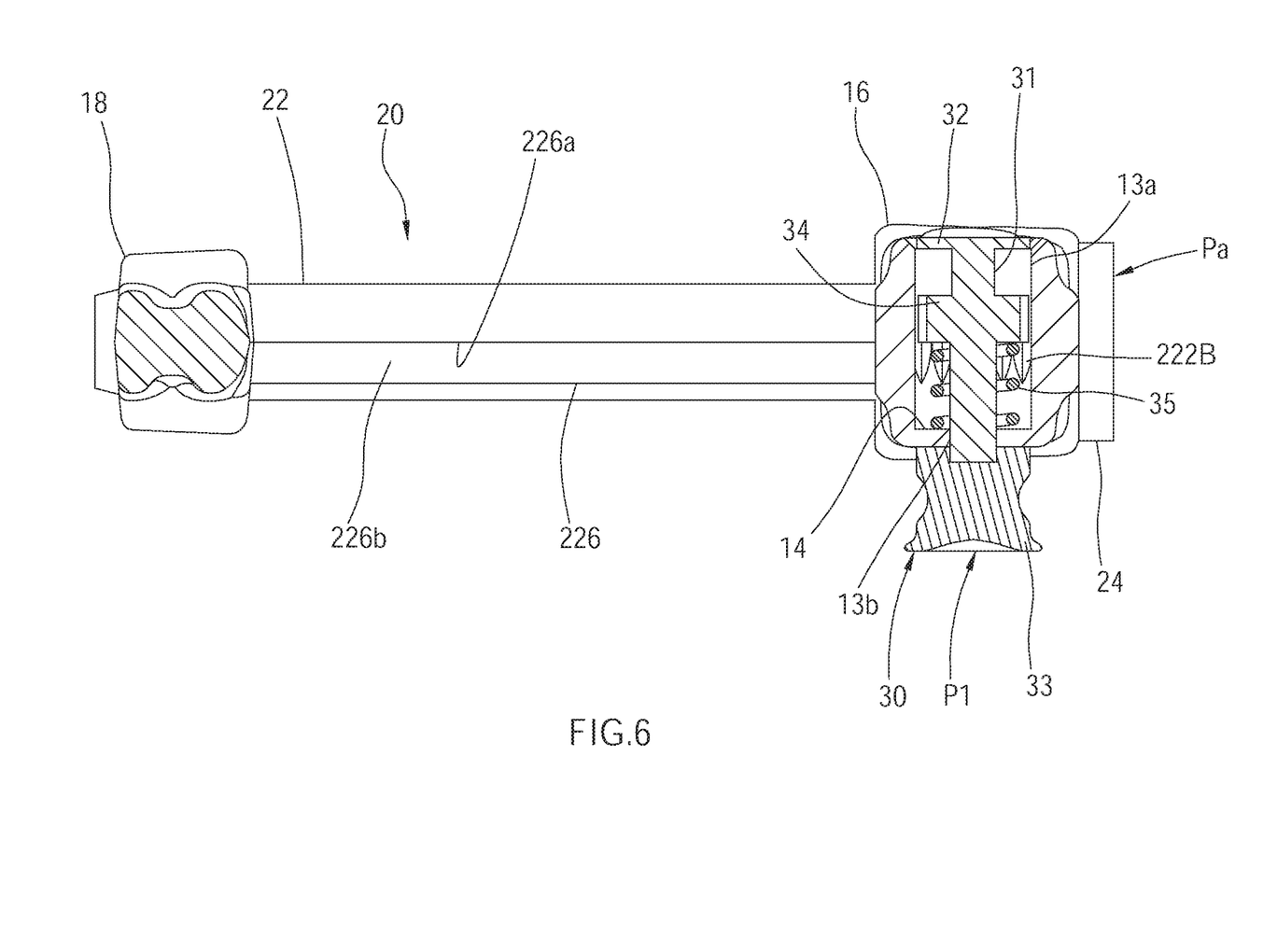
FIG. 6 is a sectional view taken along the 6-6 line in FIG. 4, showing the bolt is located at the closed position.

As illustrated in FIG. 1 to FIG. 3, the main body 10 has a body portion 12, a shoulder 14, a first end portion 16, and a second end portion 18, wherein the first end portion 16 and the second end portion 18 are respectively located at two ends of the body portion 12. The body portion 12 is arch-shaped and has a perforation 13 on a side of the body portion 12 where is near the first end portion 16. Referring to FIG. 6, the perforation 13 has a first section 13a and a second section 13b along an axial direction of the perforation 13, wherein a diameter of the first section 13a is greater than a diameter of the second section 13b. The main body 10 forms the shoulder 14 at a junction between the first section 13a and the second section 13b. The first end portion 16 is disposed with a bolt bore 16a penetrating the first end portion 16. The bolt bore 16a communicates with the perforation 13 via a connecting hole 12a, and a central axis of the bolt bore 16a is perpendicular to a central axis of the perforation 13. The second end portion 18 has a fixed hole 18a, wherein a central axis of the fixed hole 18a and the central axis of the bolt bore 16a coincide. In the current embodiment, the body portion 12, the shoulder 14, the first end portion 16, and the second end portion 18 are integrally formed as a monolithic unit.

Figure 5:
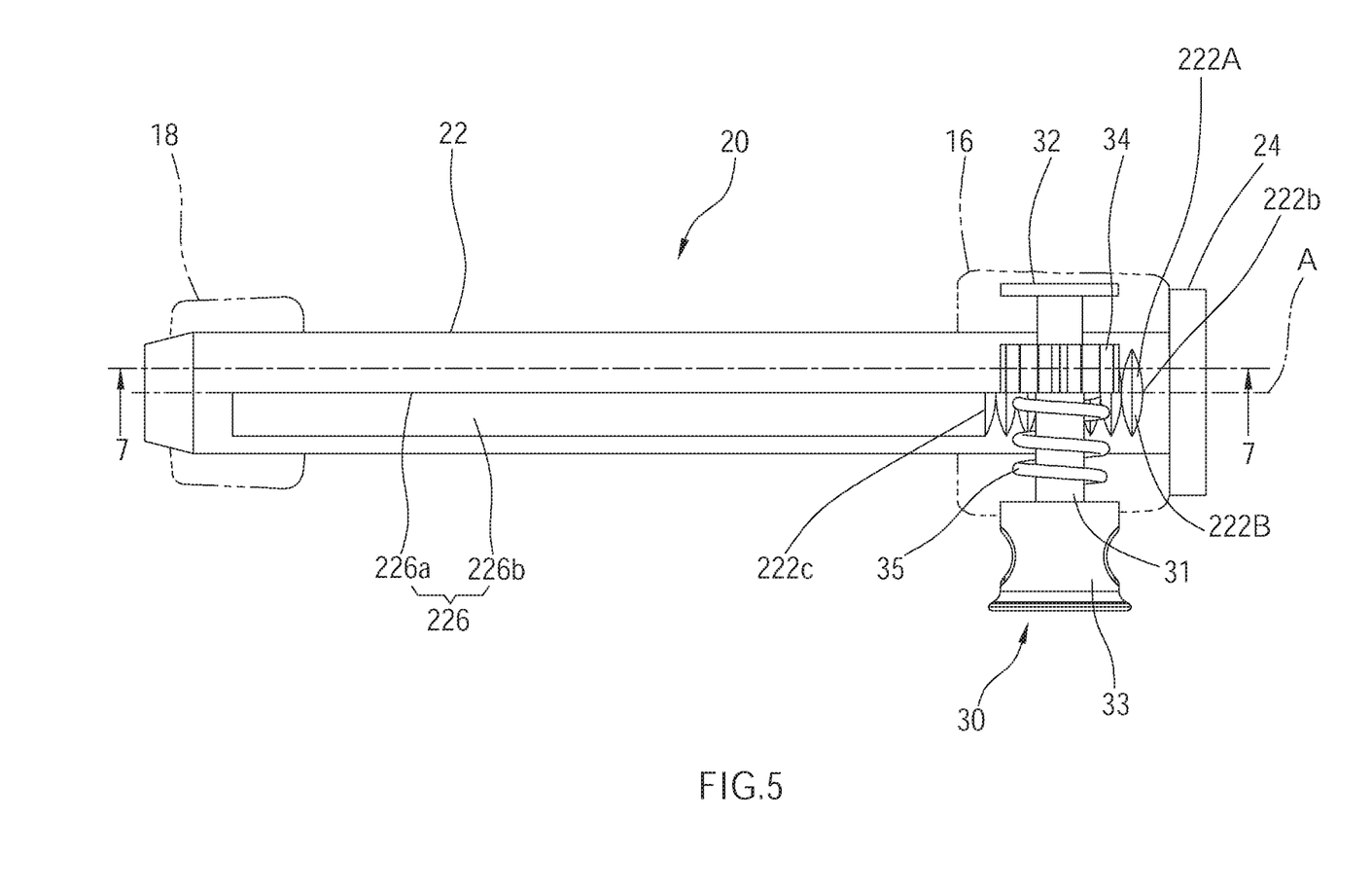
FIG. 5 is a top view of the connecting device of the embodiment according to the present invention.
Figure 7:
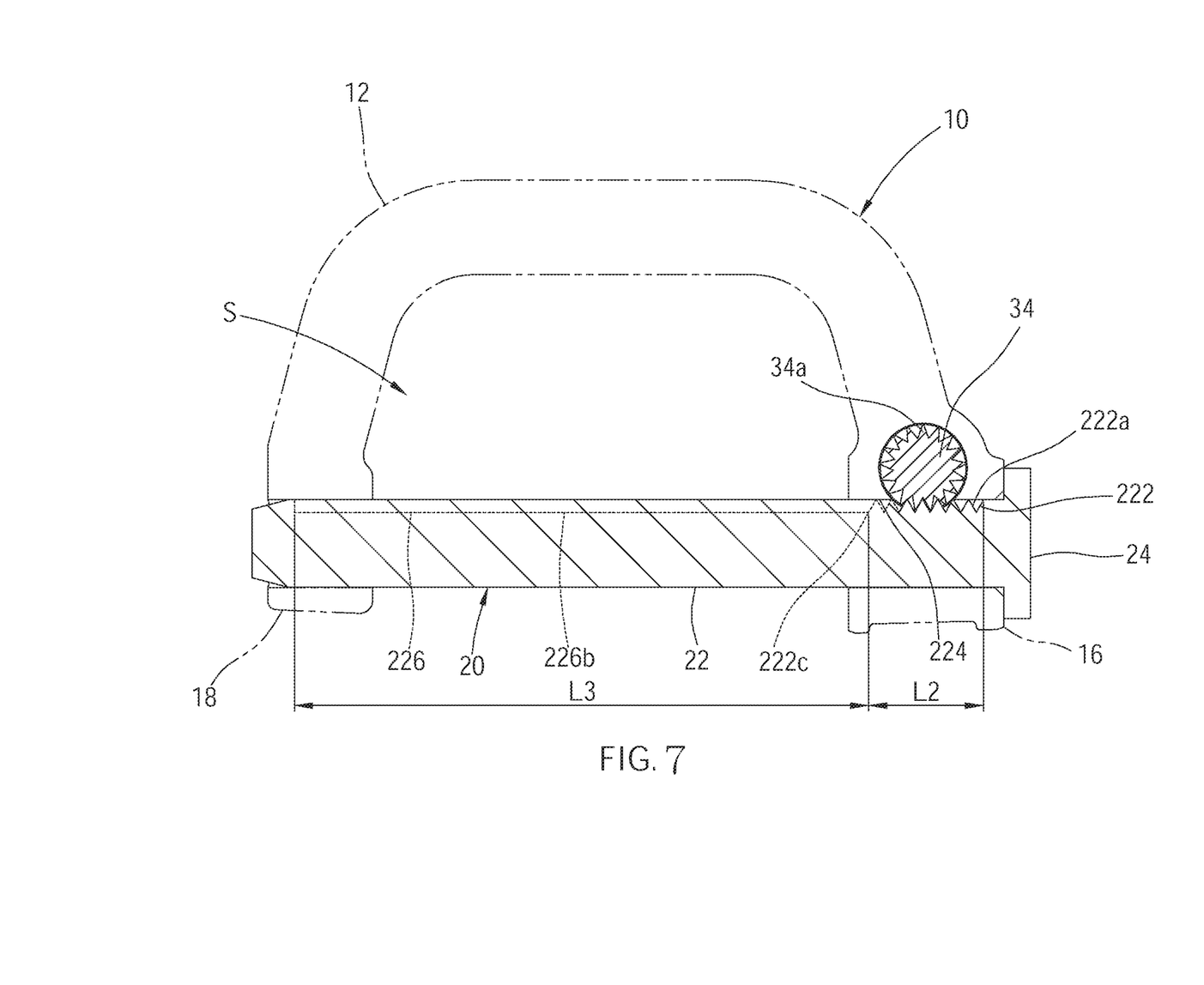
FIG. 7 is a sectional view taken along the 7-7 line in FIG. 5.
Figure 9:
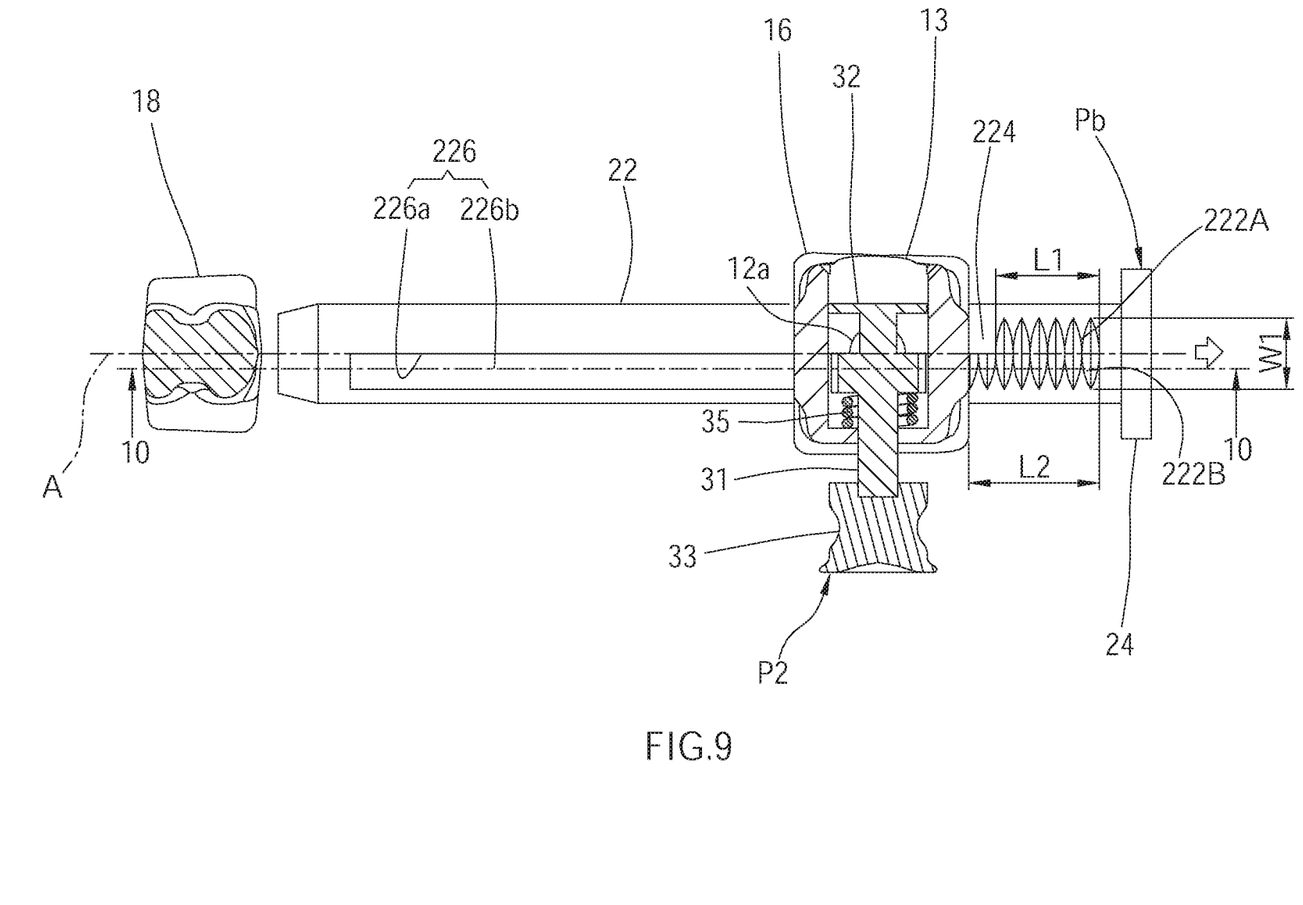
FIG. 9 is similar to FIG. 8, showing the second teeth portion is moved into the slot from the second half part, and the bolt is located at the opened position.

The bolt 20 has a bolt body 22 in a rod shape and a head 24 connected to an end of the bolt body 22. A surface of the bolt body 22 has a first teeth portion 222, a stopper 224, and a slot 226, wherein the first teeth portion 222 is formed by a plurality of teeth 222a arranged in an axial direction of the bolt body 22, and has a first end 222b and a second end 222c respectively formed at a starting edge and an ending edge of the first teeth portion 222. Referring to FIG. 5 and FIG. 9, the first teeth portion 222 could be divided into a first half part 222A and a second half part 222B by an imaginary line A which is parallel to the axial direction of the bolt body 22, wherein a first length L1 of the first half part 222A of the first teeth portion 222 in the axial direction of the bolt body 22 is shorter than a second length L2 of the second half part 222B of the first teeth portion 222 in the axial direction of the bolt body 22 (as shown in FIG. 9). The stopper 224 is located at the second end 222c of the first half part 222A of the first teeth portion 222. The slot 226 is adjacent to the first teeth portion 222, and an end of the slot 226 is connected to the second end 222c of the first teeth portion 222 and corresponds to the second half part 222B of the first teeth portion 222. A third length L3 of the slot 226 in the axial direction of the bolt body 22 is greater than the second length L2 of the second half part 222B of the first teeth portion 222 in the axial direction of the bolt body 22 (as shown in FIG. 7). More specifically, in the current embodiment, the bolt body 22 is circular rod-shaped, wherein the slot 226 is formed by cutting a periphery of the bolt body 22 along the axial direction of the bolt body 22. A surface of the slot 226 has a vertical surface 226a and a horizontal surface 226b, wherein a top edge of the vertical surface 226a forms a part of the periphery of an uncut portion of the bolt body 22, and the uncut portion of the bolt body 22 forms the stopper 224 near the second end 222c the first teeth portion 222. However, in other embodiments, the stopper 224 could be, but not limited to, a protrusion protruding along a radial direction of the bolt body 22. The head 24 is connected to an end of the bolt body 22 near the first end 222b of the first teeth portion 222, wherein a maximum outer diameter of the head 24 is greater than a diameter of the bolt bore 16a.

Figure 8:
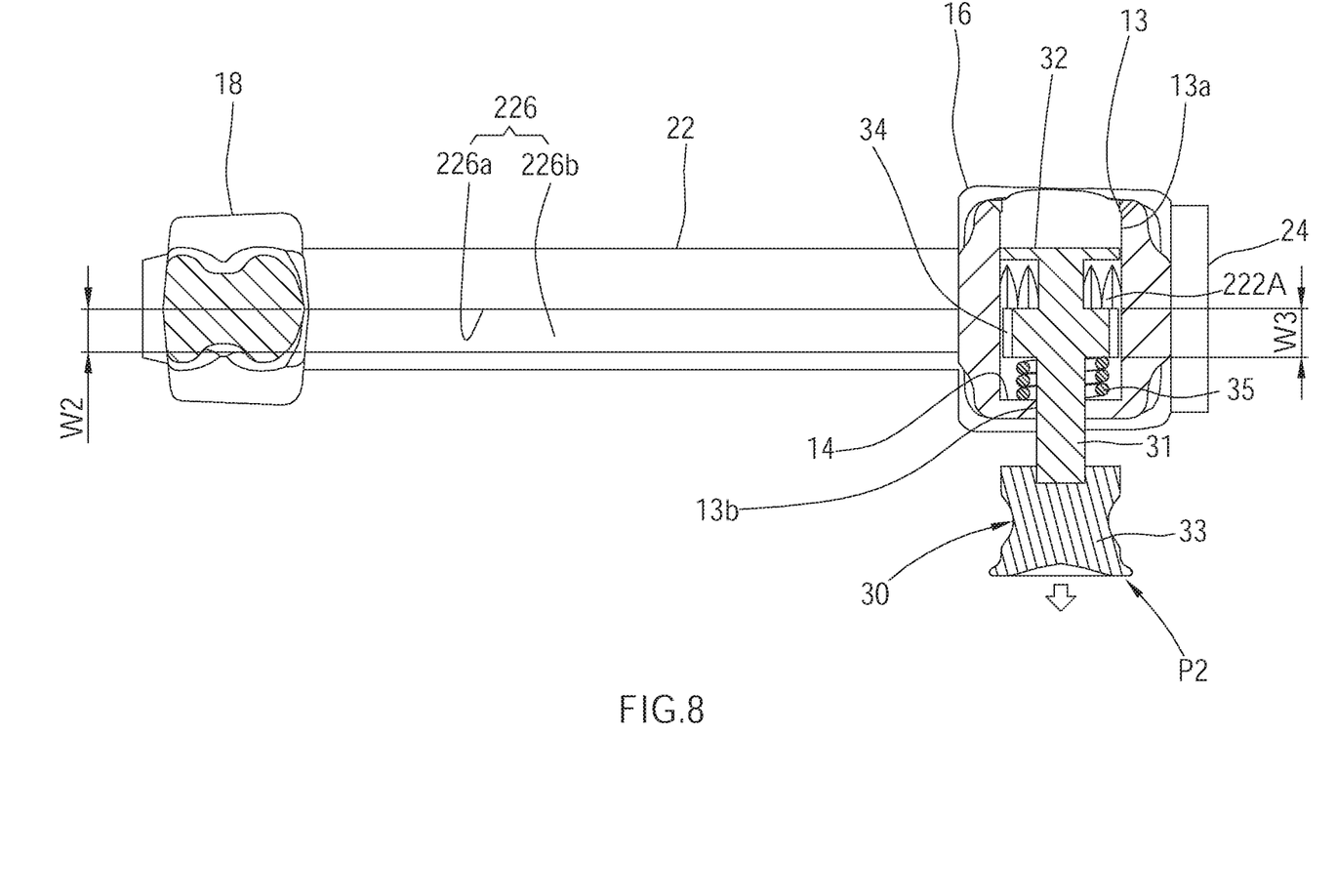
FIG. 8 is similar to FIG. 6, showing the locking member is located at the second position, and the second teeth portion is moved from the first half part of the first teeth portion to the second half part.

As illustrated in FIG. 8 and FIG. 9, the first teeth portion 222 has a first width W1 which is a distance between two lateral ends of the first teeth portion 222 along a secant of the bolt body 22 passing through the two lateral ends of the first teeth portion 222, wherein the secant of the bolt body 22 is perpendicular to the axial direction of the bolt body 22, and the slot 226 has a second width W2 which is a width of the horizontal surface 226b in a direction perpendicular to a longitudinal axis of the slot 226. The first width W1 is greater than the second width W2. In the current embodiment, the first width W1 is twice as great as the second width W2. Additionally, a width of the second half part 222B of the first teeth portion 222 in a direction perpendicular to the axial direction of the bolt body 22 is equal to the second width W2.

Figure 10:
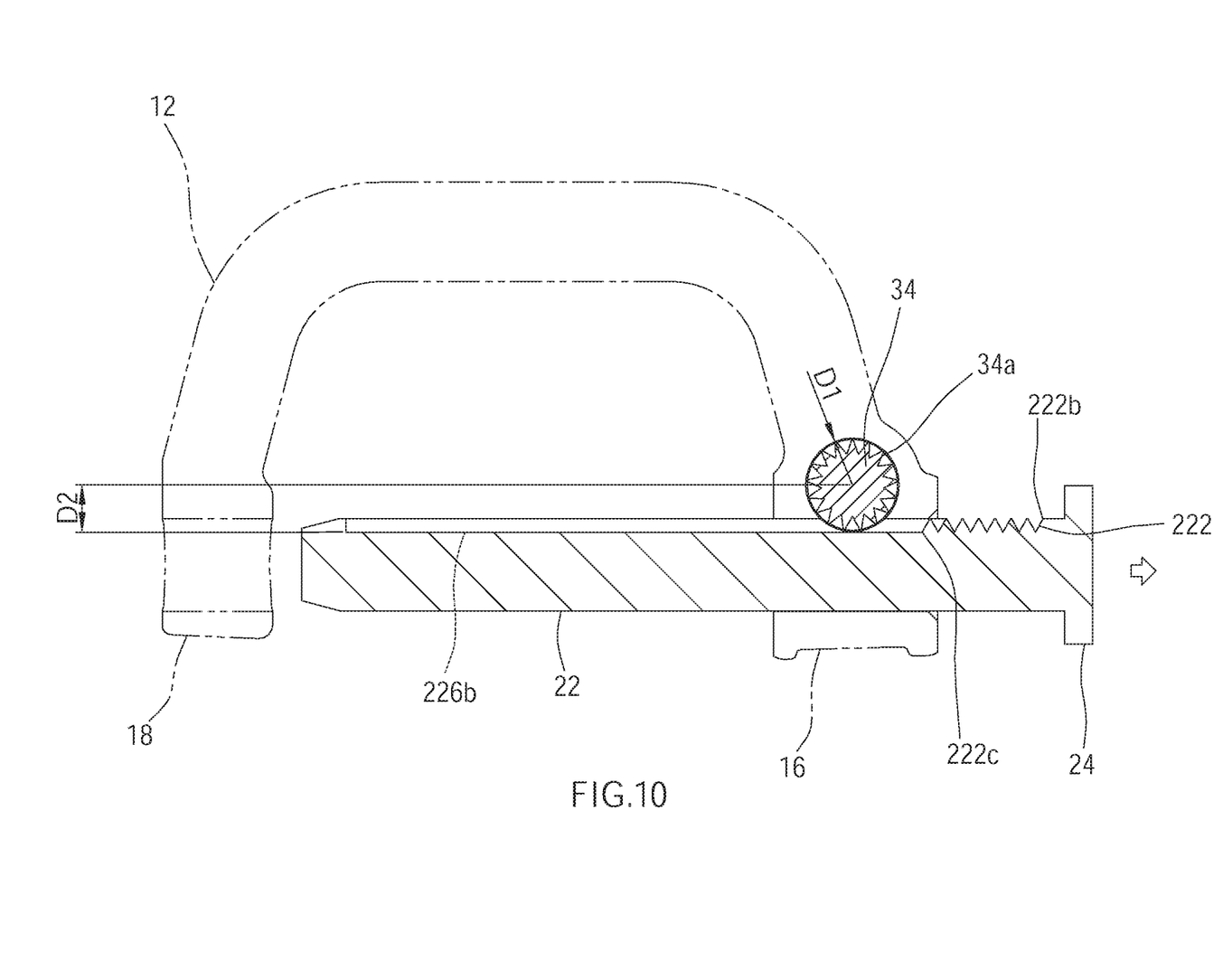
FIG. 10 is a sectional view taken along the 10-10 line in FIG. 9, showing the second teeth portion is located in the slot.

The bolt body 22 passes through the bolt bore 16a and could be moved between a closed position Pa (as shown in FIG. 6) and an opened position Pb (as shown in FIG. 9). A line direction from the closed position Pa to the opened position Pb is parallel to the central axis of the bolt bore 16a. As illustrated in FIG. 6 and FIG. 7, when the bolt 20 is located at the closed position Pa, another end of the bolt body 22 which is not connected to the head 24 is engaged with the second end portion 18 by passing through the fixed hole 18a to form an enclosure S with the main body 10, and the head 24 abuts against a peripheral edge of the bolt bore 16a. As illustrated in FIG. 9 and FIG. 10, when the bolt 20 is located at the opened position Pb, the another end of the bolt body 22 which is not connected to the head 24 is disengaged from the second end portion 18 to form an opening with the main body 10, thereby making the connecting device 100 of the retaining ring of the safety belt in an unlocking status.

The locking member 30 passes through the perforation 13 of the main body 10 and has a shaft portion 31, a first operated portion 32, a second operated portion 33, a second teeth portion 34, and a spring 35. The shaft portion 31 is in a circular-rod shape, and an axial direction of the shaft portion 31 is perpendicular to the axial direction of the bolt body 22. The first operated portion 32 and the second operated portion 33 are respectively connected to two ends of the shaft portion 31 and could be operated by an external force. In the current embodiment, the second operated portion 33 is located out of the perforation 13. The second teeth portion 34 is located between the first operated portion 32 and the second operated portion 33 and is securely connected to the shaft portion 31. The second teeth portion 34 is formed by a plurality of teeth 34a arranged along at least a part of a circumference formed around a central axis of the shaft portion 31, wherein a radius of the circumference formed around the central axis of the shaft portion 31 is greater than a radius of the shaft portion 31 and is smaller than a radius of the first section 13a of the perforation 13. In the current embodiment, the second teeth portion 34 is a gear. A diameter of the gear is greater than a diameter of the shaft portion 31, and is smaller than the diameter of the first section 13a of the perforation 13. The spring 35 fits around the shaft portion 31. An end of the spring 35 abuts against the second teeth portion 34, and another end of the spring 35 abuts against the shoulder 14. An elastic force of the spring 35 urges the locking member 30 to move toward a first position P1. Referring to FIG. 8 to FIG. 10, in the current embodiment, the diameter of the first section 13a of the perforation 13 is greater than a maximum outer diameter of the first operated portion 32, and a third width W3 of the second teeth portion 34 in an axial direction of the second teeth portion 34 is smaller than or equal to the second width W2 of the slot 226. When the shaft portion 31 passes through the perforation 13, the central axis of the perforation 13 and the central axis of the shaft portion 31 coincide.

The locking member 30 could rotate around the central axis of the shaft portion 31 and move along the axial direction of the shaft portion 31 between the first position P1 (as shown in FIG. 6) and a second position P2 (as shown in FIG. 8). As illustrated in FIG. 6 and FIG. 7, when the locking member 30 is located at the first position P1, the second operated portion 33 abuts against the main body 10, and a part of the teeth 34a of the second teeth portion 34 is meshed with a part of the teeth 222a of the first half part 222A of the first teeth portion 222, so that the bolt 20 is located at the closed position Pa. When an external force is applied to make the bolt 20 being moved away from the closed position Pa, the stopper 224 abuts against at least one of the teeth 34a of the second teeth portion 34 to prevent the second teeth portion 34 from rotating counter-clockwise, thereby avoiding the bolt 20 being unexpectedly moved away from the closed position Pa. A length of the spring 35, which is not pressed, in an axial direction of the spring 35 is equal to or greater than a minimum distance between the shoulder 14 and the second teeth portion 34, so that the second teeth portion 34 is kept corresponding to the first half part 222A of the first teeth portion 222 when there is no external force exerted on the locking member 30. As illustrated in FIG. 8, when the locking member 30 is located at the second position P2, the second operated portion 33 does not abut against the main body 10, and a part of the teeth 34a of the second teeth portion 34 is meshed with a part of the teeth 222a of the second half part 222B of the first teeth portion 222, wherein the spring 35 is pressed by the second teeth portion 34 and the shoulder 14.

With the aforementioned design, an operation of the connecting device 100 of the retaining ring of the safety belt is described as following. Referring to FIG. 4 to FIG. 7, when the bolt 20 is located at the closed position Pa and the locking member 30 is located at the first position P1, a part of the teeth 34a of the second teeth portion 34 is meshed with a part of the teeth 222a of the first half part 222A of the first teeth portion 222, and the second teeth portion 34 corresponds to the first half part 222A of the first teeth portion 222, so that a part of the teeth 34a of the second teeth portion 34 could be blocked by the stopper 224 of the bolt body 22, thereby avoiding the bolt body 22 being disengaged from the fixed hole 18a. In the current embodiment, the second operated portion 33 is a knob of the connecting device 100 of the retaining ring of the safety belt. Referring to FIG. 8 again, when the second operated portion 33 is pulled to move the locking member 30 from the first position P1 to the second position P2, the second teeth portion 34 is moved to the second half part 222B of the first teeth portion 222 from the first half part 222A, so that a part of the teeth 34a of the second teeth portion 34 is meshed with a part of the teeth 222a of the second half part 222B, and the spring 35 is pressed by the second teeth portion 34 and the shoulder 14, wherein at this time, the second operated portion 33 does not abut against the main body 10, and the first operated portion 32 is moved in the perforation 13. Referring to FIG. 9 and FIG. 10, when the second operated portion 33 is pulled to press the spring 35, the locking member 30 is rotated to push the bolt 20 to move by meshing the second teeth portion 34 and the second half part 222B of the first teeth portion 222. When the second teeth portion 34 corresponds to the slot 226, the second teeth portion 34 abuts against the vertical surface 226a of the slot 226 under a compressed elastic force of the spring 35, and the bolt 20 is moved away from the closed position Pa. A distance D1 between the central axis of the shaft portion 31 and a top of one of the teeth of the second teeth portion 34 is shorter than a distance D2 between the central axis of the shaft portion 31 and the horizontal surface 226b of the slot 226, so that the teeth 34a could not be worn by the horizontal surface 226b of the slot 226, thereby avoiding affecting the mesh between the second teeth portion 34 and the first teeth portion 222. Moreover, since the first length L1 of the first half part 222A of the first teeth portion 222 in the axial direction of the bolt body 22 is shorter than the second length L2 of the second half part 222B of the first teeth portion 222 in the axial direction of the bolt body 22, a user only has to slightly rotate the second operated portion 33 to keep the second teeth portion 34 driven by the second operated portion 33 in a position that the second teeth portion 34 abuts against the vertical surface 226a of the slot 226, and then the user could pulled the bolt 20 by a merely single hand to move the second teeth portion 34 into the slot 226, so that the bolt 20 is located at the opened position Pb, thereby the connecting device 100 is unlocked. On the other side, when the connecting device 100 is about to be locked, the connecting device 100 could be locked merely by moving the bolt 20 in a direction toward the fixed hole 18a to make the second teeth portion 34 be disengaged from the vertical surface 226a of the slot 226. When the second teeth portion 34 does not abut against the vertical surface 226a of the slot 226, a compressed elastic force of the spring 35 could push the second teeth portion 34 to the first half part 222A of the first teeth portion 222, leading a part of the teeth 34a of the second teeth portion 34 to be meshed with a part of the teeth 222a of the first half part 222A of the first teeth portion 222, so that the locking member 30 returns to the first position P1, thereby returning the bolt 20 is located at the closed position Pa.

The above-mentioned embodiment has two advantages: First, the process of unlocking the connecting device 100 is simplified, increasing the convenience. The connecting device 100 of the retaining ring of the safety belt merely utilizes one locking member 30, so that the user could pull and rotate the locking member 30 by one hand to unlock the connecting device 100, which solves the problem that the user must unlock a locking member of a conventional connecting device by two hands, thereby the user has a free hand to work or hold a support, enhancing the convenience for using the connecting device 100.

Second, a structure of the connecting device 100 is stable and user-friendly. Since the first length L1 of the first half part 222A of the first teeth portion 222 in the axial direction of the bolt body 22 is shorter than the second length L2 of the second half part 222B of the first teeth portion 222 in the axial direction of the bolt body 22, and the slot 226 is adjacent to the first teeth portion 222, the bolt 20 could be pulled away from the fixed hole 18a by a single hand to quickly unlock the connecting device 100 of the retaining ring of the safety belt when the second operated portion 33 is pulled and slightly rotated to keep the second teeth portion 34 abutting against the vertical surface 226a of the slot 226, thereby the user does not need to continuously rotating the second operated portion 33 to unlock the connecting device 100.

Figure 11:
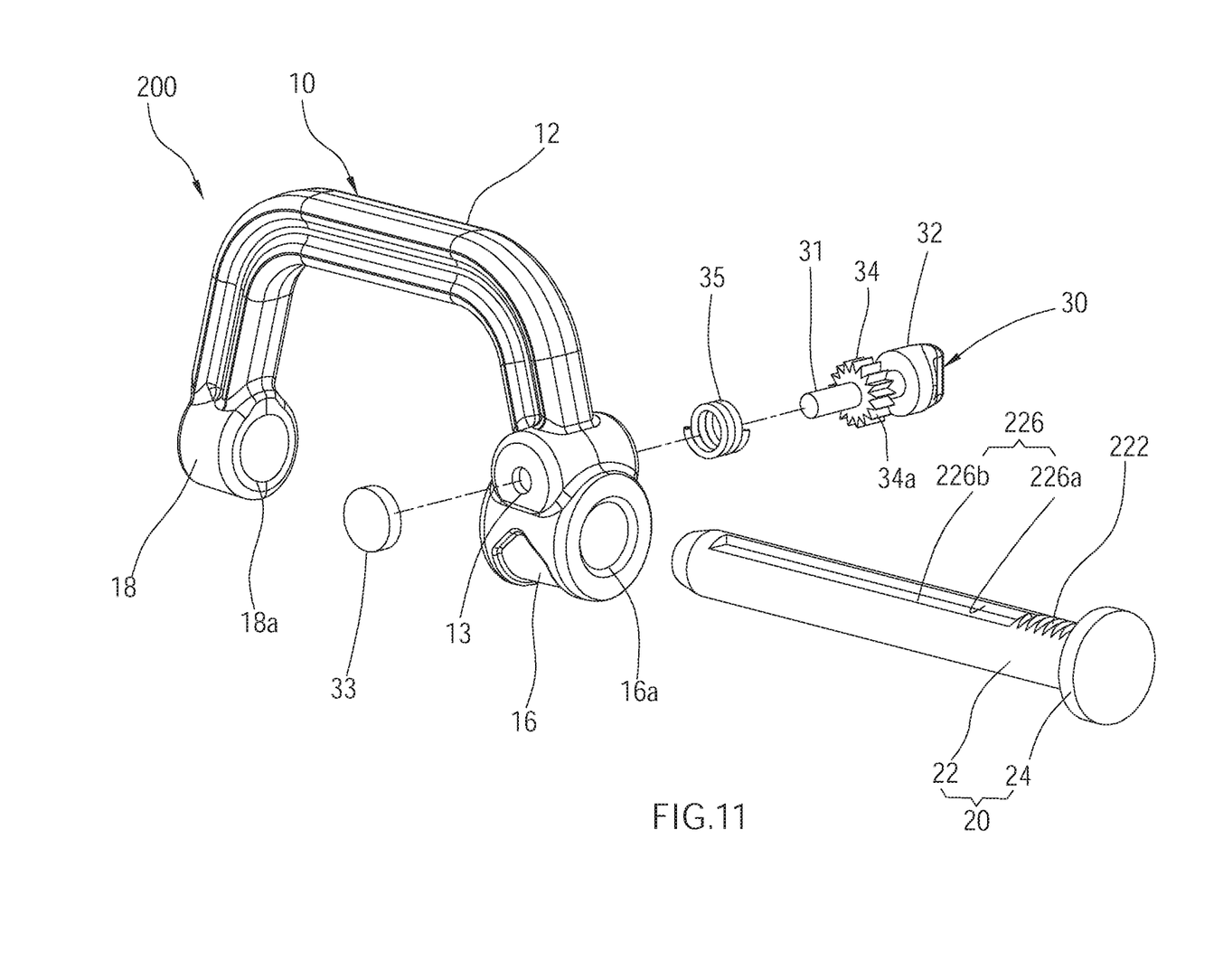
FIG. 11 is an exploded view of the connecting device of the retainer of the safety belt of another embodiment according to the present invention.
Figure 12:
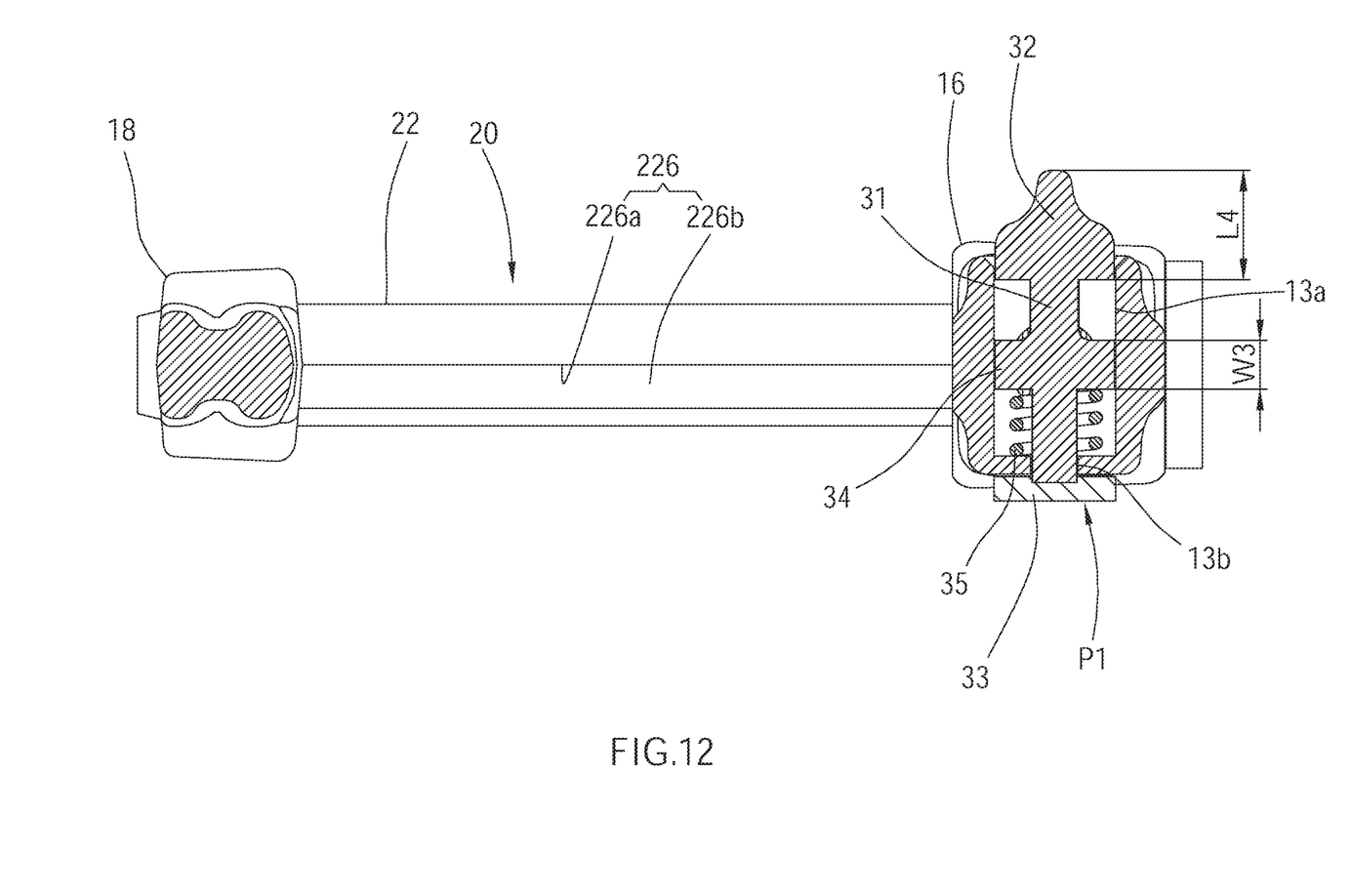
FIG. 12 is similar to FIG. 8, showing the bolt is located at the closed position.

As illustrated in FIG. 11 and FIG. 12, a connecting device 200 of a retaining ring of a safety belt of another embodiment provided by the present invention has the same structure as that of the connecting device 100 of the aforementioned embodiment, except the position of the knob manipulated by the user. In the current embodiment, the first operated portion 32 is the knob of the connecting device 200 of the retaining ring of the safety belt. A part of the first operated portion 32 is located outside the perforation 13. In the current embodiment, a way of unlocking the connecting device 200 is completed by pressing the first operated portion 32 to move the second teeth portion 34 to the second half part 222B of the first teeth portion 222 from the first half part 222A. When the first operated portion 32 is rotated in a pressed state to drive the second teeth portion 34 to move into the slot 226 along the second half part 222B of the first teeth portion 222, thereby making the bolt 20 be located in the opened position Pb. In order to avoid the first operated portion 32 being totally pressed into the perforation 13, which is not beneficial for a user to use, as illustrated in FIG. 12, a maximum length L4 of the first operated portion 32 in an axial direction of the first operated portion 32 is 1.5 times as great as the third width W3 of the second teeth portion 34 in an axial direction of the second teeth portion 34. In summary, the connecting device 100 of the embodiment and the connecting device 200 of the another embodiment are used in different ways. The connecting device 100 of the embodiment is used by pulling and rotating the locking member 30 to unlock, while the connecting device 200 of the another embodiment is used by pressing and rotating the locking member 30 to unlock, so that the user could choose a suitable connecting device depending on requirement and preference.

It must be pointed out that the embodiment described above is only a preferred embodiment of the present invention. All equivalent structures which employ the concepts disclosed in this specification and the appended claims should fall within the scope of the present invention.

What is claimed is:

1. A connecting device of a retaining ring of a safety belt, comprising
   a main body having a body portion, a first end portion, and a second end portion, wherein the first end portion and the second end portion are respectively located at two ends of the body portion; the first end portion has a bolt bore penetrating the first end portion;
   a bolt having a bolt body which has a first teeth portion and a stopper, wherein the first teeth portion is formed by a plurality of teeth arranged in an axial direction of the bolt body, and the first teeth portion is divided into a first half part and a second half part by an imaginary line which is parallel to the axial direction of the bolt body; the first teeth portion has a first end and a second end, and the stopper is located at the second end of the first half part; the bolt body passes through the bolt bore; when the bolt is located at a closed position, an end of the bolt body is engaged with the second end portion, thereby forming an enclosure with the main body;
   a locking member having a shaft portion and a second teeth portion which is formed by a plurality of teeth arranged on at least a portion of a circumference formed around a central axis of the shaft portion, wherein the locking member is engaged with the main body, and is rotatable along the central axis of the shaft portion, and is movable between a first position and a second position; when the bolt is located at the closed position and the locking member is located at the first position, a part of the plurality of teeth of the second teeth portion is engaged with a part of the plurality of teeth of the first half part of the first teeth portion; when a force is exerted to pull the bolt away from the closed position, the stopper abuts against at least one of the plurality of teeth of the second teeth portion, thereby the bolt is blocked by the second teeth portion; when the bolt is at the closed position and the locking member is at the second position, a part of the plurality of teeth of the second teeth portion is engaged with a part of the plurality of teeth of the second half part.

2. The connecting device of claim 1, wherein the bolt has a head, and the head is connected to an end of the bolt body which is near the first end of the first teeth portion; the bolt body has a slot which is adjacent to the first teeth portion; an end of the slot is connected to the second end of the first teeth portion and corresponds to the second half part; when the bolt is in an opened position, a part of the plurality of teeth of the second teeth portion is located in the slot.

3. The connecting device of claim 2, wherein the main body has a perforation communicating with the bolt bore; the perforation has a first section and a second section along an axial direction of the perforation; a diameter of the first section is greater than a diameter of the second section; the main body forms a shoulder between the first section and the second section; the locking member passes through the perforation of the main body, and two ends of the shaft portion respectively comprises a first operated portion and a second operated portion which are adapted to be operated by an external force; a part of at least one of the first operated portion and the second operated portion is located out of the perforation; the second teeth portion is located between the first operated portion and the second operated portion; a spring fits around the shaft portion; an end of the spring abuts against the second teeth portion, and another end of the spring abuts against the shoulder; an elastic force of the spring pushes the locking member to move toward the first position.

4. The connecting device of claim 3, wherein when the locking member is at the second position, the spring is pressed; the locking member in the second position is rotated to push the bolt to move by meshing the second teeth portion with the second half part of the first teeth portion; when the second teeth portion corresponds to the slot, the bolt leaves the closed position.

5. The connecting device of claim 2, wherein an outer diameter of the head of the bolt is greater than a diameter of the bolt bore.

6. The connecting device of claim 2, wherein a third length of the slot in the axial direction of the bolt body is greater than a second length of the second half part of the first teeth portion in the axial direction of the bolt body.

7. The connecting device of claim 2, wherein when the second teeth portion is located in the slot, a distance between the central axis of the shaft portion and a top of one of the teeth of the second teeth portion is shorter than a distance between the central axis of the shaft portion and a surface of the slot.

8. The connecting device of claim 2, wherein the first teeth portion has a first width which is a distance between two lateral ends of the first teeth portion along a secant of the bolt body 22 passing through the two lateral ends of the first teeth portion; the slot has a second width which is a width of the horizontal surface 226b in a direction perpendicular to a longitudinal axis of the slot 226, and the first width is greater than the second width.

9. The connecting device of claim 8, wherein the first width is twice as great as the second width, and a width of the second half part of the first teeth portion is equal to the second width.

10. The connecting device of claim 8, wherein a third width of the second teeth portion in an axial direction of the second teeth portion is smaller than or equal to the second width.

11. The connecting device of claim 1, wherein the axial direction of the bolt body is perpendicular to an axial direction of the shaft portion of the locking member.

12. The connecting device of claim 1, wherein a first length of the first half part of the first teeth portion in the axial direction of the bolt body is shorter than a second length of the second half part of the first teeth portion in the axial direction of the bolt body.

\* \* \* \* \*